United States Patent [19]

Fujii

[11] Patent Number: 4,875,955
[45] Date of Patent: Oct. 24, 1989

[54] METHOD AND APPARATUS FOR PREVENTING INSTALLATION IN AN AUTOMOBILE BODY OF A GLASS WINDOW PANEL HAVING OVERCURED ADHESIVE THEREON

[75] Inventor: Hiroshi Fujii, Hirashima, Japan

[73] Assignee: Mazda Motor Manufacturing (USA) Corporation, Flat Rock, Mich.

[21] Appl. No.: 238,818

[22] Filed: Aug. 31, 1988

[51] Int. Cl.⁴ .................. B23Q 17/00; B05B 15/10
[52] U.S. Cl. .................... 156/64; 156/362; 156/366; 156/378
[58] Field of Search .............. 156/350–352, 156/364, 362, 366, 368, 64, 378, 574, 575, 71; 118/699

[56] References Cited

U.S. PATENT DOCUMENTS

| | | | |
|---|---|---|---|
| 3,981,763 | 9/1976 | Brocklehurst | 156/352 |
| 4,453,303 | 6/1984 | Leddet | 29/407 |
| 4,458,628 | 7/1984 | Fujii et al. | 118/697 X |
| 4,696,712 | 9/1987 | Nonaka | 156/64 X |

FOREIGN PATENT DOCUMENTS

| | | |
|---|---|---|
| 0111206 | 6/1984 | European Pat. Off. |
| 62-221984 | 9/1984 | Japan |
| 62-101587 | 5/1987 | Japan |
| 62-103270 | 5/1987 | Japan |
| 62-205869 | 9/1987 | Japan |
| 62-216877 | 9/1987 | Japan |
| 62-221982 | 9/1987 | Japan |

*Primary Examiner*—David Simmons
*Attorney, Agent, or Firm*—Wenderoth, Lind & Ponack

[57] ABSTRACT

An apparatus and method for sequentially applying adhesive to windshields, conveying each windshield to an inverting apparatus, inverting the windshield, removing the windshield with a transfer device and installing the windshield in automobile bodies. The actual curing time of the adhesive on the windshield is measured and compared to a reference curing time and if the actual curing time exceeds the reference curing time, the apparatus is operated to prevent the windshield from being installed on an automobile body. Instead of being installed by the transfer device, when the actual curing time exceeds the reference curing time, the windshield is either transported by the windshield conveyor to an auxiliary transfer device which transfers the windshield to a removing conveyor or the transfer device delivers the windshield directly to the removing conveyor. A computer and sensors are provided for automating operation of the apparatus.

20 Claims, 4 Drawing Sheets

METHOD AND APPARATUS FOR PREVENTING INSTALLATION IN AN AUTOMOBILE BODY OF A GLASS WINDOW PANEL HAVING OVERCURED ADHESIVE THEREON

BACKGROUND OF THE INVENTION

1. Field of the Invention

The present invention relates to an automated process line for installing glass window panels in automobile bodies and in particular, preventing the installation of glass window panels having overcured adhesive thereon.

2. Description of the Prior Art

The method and apparatus of the present invention are useful in conventional systems for installing windshields in automobile bodies. Such systems include those disclosed in Japanese Laid-Open Application Nos. 62-101587, 62-103270, 62-216877, 62-221982 and 62-221984. Representative of the systems shown in Japanese Laid-Open Patent Application Nos. 62-101587, 62-103270 and 62-221984 is the system shown in FIG. 1a. In this system, windshields 2 are supplied along an auxiliary transfer mechanism 1 to a setting mechanism 3 which sets each of the windshields on a respective pallet (not shown) after which the windshield and pallet are transferred to a first transfer mechanism 4. Located along the first transfer mechanism 4 are various stations including a positioning mechanism 5, an adhesive applying mechanism 6 and a transfer mechanism 7 for removing the windshield and pallet from the first transfer mechanism 4. A second transfer mechanism 8 is provided for conveying windshields of the type mounted manually by means of rubber seals. In the case of a windshield mounted by means of adhesive, a robot 9 rotatably mounted on a base is provided for removing the windshield from the transfer mechanism 7, the robot 9 being movable from a rear windshield mounting position 10 to a front windshield mounting position 11. Automobile bodies 12 are conveyed intermittently along a conveyor line 13 and the robot 9 installs rear windshields 2d and front windshields 2c in the automobile bodies. Operation of the system just described is controlled by a computer 14. A problem with this system is that adhesive applied at station 6 can become overcured by the time the windshield is installed on a car body 12 due to environmental conditions or delays in transfer of the windshield to the car body.

The systems disclosed in Japanese Laid-Open Patent Application Nos. 62-221982 and 62-221984 are represented in FIG. 1b. This system includes a setting apparatus 15 at a setting station S1 whereat a front windshield b1 is loaded on a pallet 16 and a rear windshield b2 is loaded on a subsequent pallet 16. The pallets travel along a windshield supply line 17 through a primer coating station S2, a first dryer S3, a second dryer S4, a first adhesive coating station S5, a first transfer station S6, a second adhesive coating station S7 and a second transfer station S8. The rear windshields b2 pass directly through the first adhesive coating station S5 and the first transfer station S6 and instead are coated with adhesive at station S7. The front windshields b1 are coated with adhesive at station S5 by means of a coating robot 18. A transfer mechanism 19 including a lifter apparatus removes a front windshield b1 from the windshield supply line 17 and a feeding apparatus 20 moves the windshield b1 to a position for pick up by a front windshield fitting robot 21. The rear windshield is coated with adhesive by a coating robot 22 at station S7 after which the rear windshield is removed from the windshield supply line 17 by a transfer mechanism 23 including a lifter apparatus at station S8 and a feeding apparatus 24 moves the rear windshield to a position for pick up by a rear windshield fitting robot 25. Car bodies A are fed intermittently to a windshield fitting position by means of a conveyor 26. As with the earlier described system, a problem with this system is that adhesive on the windshields may become overcured due to environmental conditions or due to process delays along the processing line.

It is conventional to provide a panel wiping apparatus along the windshield supply line, such a system being described in European Patent Publication No. A10111206 published on June 20, 1984. A conventional adhesive applying means is described in U.S. Pat. No. 4,458,628 and a conventional window setting apparatus is described in U.S. Pat. No. 4,453,303. Also, a positioning mechanism such as the positioning mechanism 5 shown in FIG. 1a is described in more detail in Japanese Laid-Open Patent Publication No. 62-205869.

SUMMARY OF THE INVENTION

An object of the present invention is to avoid the problems of the prior art systems described above by providing an apparatus and a method for preventing attachment of windshields having overcured adhesive thereon to an automobile body.

The object of the present invention can be achieved in other systems wherein glass window panels are attached to an automobile body by means of adhesive, such systems including conveyor means for supporting and conveying glass window panels along a feed path, adhesive applying means along the feed path for applying adhesive to the glass window panels, transfer means downstream of the adhesive applying means for removing the glass window panels from the conveyor means and transferring the glass window panel to a position at which the glass window panel can be attached to an automobile body and control means including preventing means for preventing attachment of the glass window panel to the automobile body when the adhesive applied to the glass window panel has cured to at least a predetermined amount.

The objectives of the present invention are also achieved by using a system having a front windshield processing line and a rear windshield processing line. In particular, each of the processing lines would include a conveyor means, an adhesive applying means and a transfer means.

The object of the present invention is applicable to a system having an inverting means along the feed path and downstream of the adhesive applying means for inverting the glass window panel. In particular, where two processing lines are provided for the front and rear windshields, each of the processing lines can include such inverting means.

To carry out the object of the present invention, the control means includes command means for controlling operation of the transfer means so that a glass window panel having adhesive thereon which has cured to at least the predetermined amount can be prevented from being applied to the automobile body by either preventing the transfer means from removing the glass window panel from the conveyor means or by transferring the glass window panel with the transfer means to a suitable location for further processing of the glass window panel. Furthermore, the preventing means includes timer means for outputting a first signal to the command means indicating when adhesive applied to the glass window panel has cured to at least the predetermined amount. The timer means includes a timer which can be preset to a plurality of reference curing times, each of the reference curing times corresponding to a different adhesive curing condition. The adhesive curing conditions can be based on the temperature or humidity of the air exposed to the curing adhesive. Additionally, a plurality of sensors are provided for outputting signals to the control means and timer means as various operations are started or finished along the processing line. For instance, a first sensor sends a signal to the timer means when the adhesive applying means finishes applying adhesive to the glass window panel and the timer means measures the actual curing time which passes after receiving this signal and compares this actual curing time to a selected reference curing time and outputs the signal to the command means when the actual curing time is no less than the selected reference curing time. Likewise, a sensor can be provided for outputting a signal to the timer means when the glass window panel has been delivered to the inverting means, another sensor can output a signal to the control means when the glass window panel has been inverted by the inverting means, another sensor can output a signal to the timer means when the transfer means begins to remove an inverted glass window panel from the inverting means and another sensor can output a signal to the control means when the transfer means finishes transferring the inverted glass window panel to a position at which the window panel can be set onto the automobile body.

The object of the present invention is further achieved by providing an auxiliary transfer means for removing a glass window panel from the conveyor means when adhesive on the glass window panel has cured beyond the predetermined amount. Also, a removing conveyor means can be provided for removing a glass window panel from the transfer means and conveying the glass window panel to a location for further processing thereof when adhesive on the glass window panel has cured to at least the predetermined amount.

The method of the present invention is applicable to a system which includes a conveyor means, adhesive applying means and a transfer means, the method comprising the steps of applying adhesive to a windshield by the adhesive applying means, determining when the adhesive applied to the windshield by the adhesive applying means has cured to at least a predetermined amount and controlling operation of the transfer means such that the windshield is set in position on an automobile body when the adhesive on the windshield has not cured to at least the predetermined amount and such that the windshield is not set in position on the automobile body when the adhesive on the windshield has cured to at least the predetermined amount. The determining step is performed by comparing an actual curing time of adhesive applied to the windshield to one of a plurality of reference curing times, each of the reference curing times corresponding to a different adhesive curing condition such as temperature and/or humidity of air exposed to the curing adhesive. For instance, one of the reference curing times can be 360 seconds, this curing time corresponding to an adhesive curing condition wherein the temperature is at least 60 degrees F and the humidity is at least 60 percent. Another reference curing time can also be 360 seconds, this curing time corresponding to an adhesive curing condition wherein the temperature is less than 60 degrees F and the humidity is at least 80 percent. Another reference curing time can be 1,080 seconds which corresponds to an adhesive curing condition wherein the temperature is below 60 degrees F. and the humidity is below 60 percent or when the temperature is at least 60 degrees F. and the humidity is below 80 percent.

BRIEF DESCRIPTION OF THE DRAWINGS

The invention will be described with reference to the accompanying drawings, in which.

DETAILED DESCRIPTION OF THE PREFERRED EMBODIMENTS

Figure 1A:
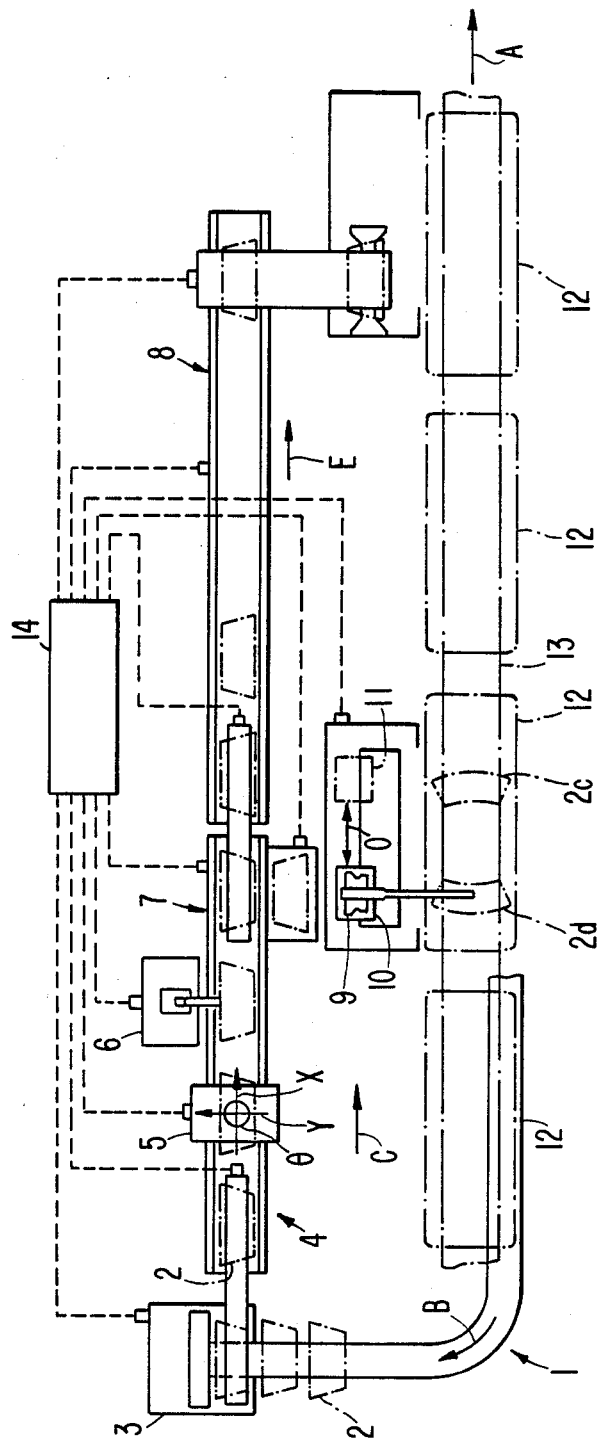
FIGS. 1a and 1b show conventional systems for installing windshields in automobiles.
Figure 1B:
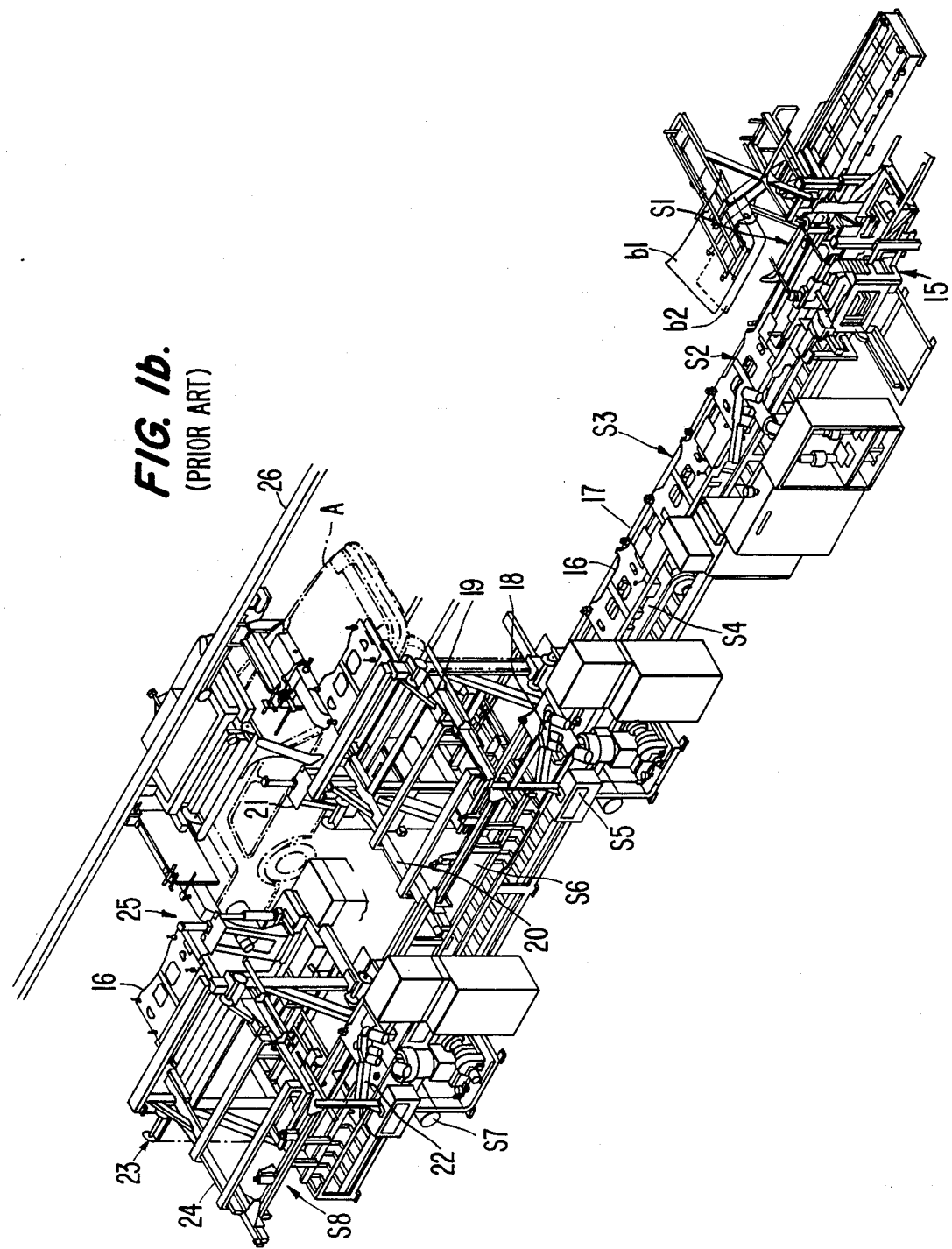
Figure 2:
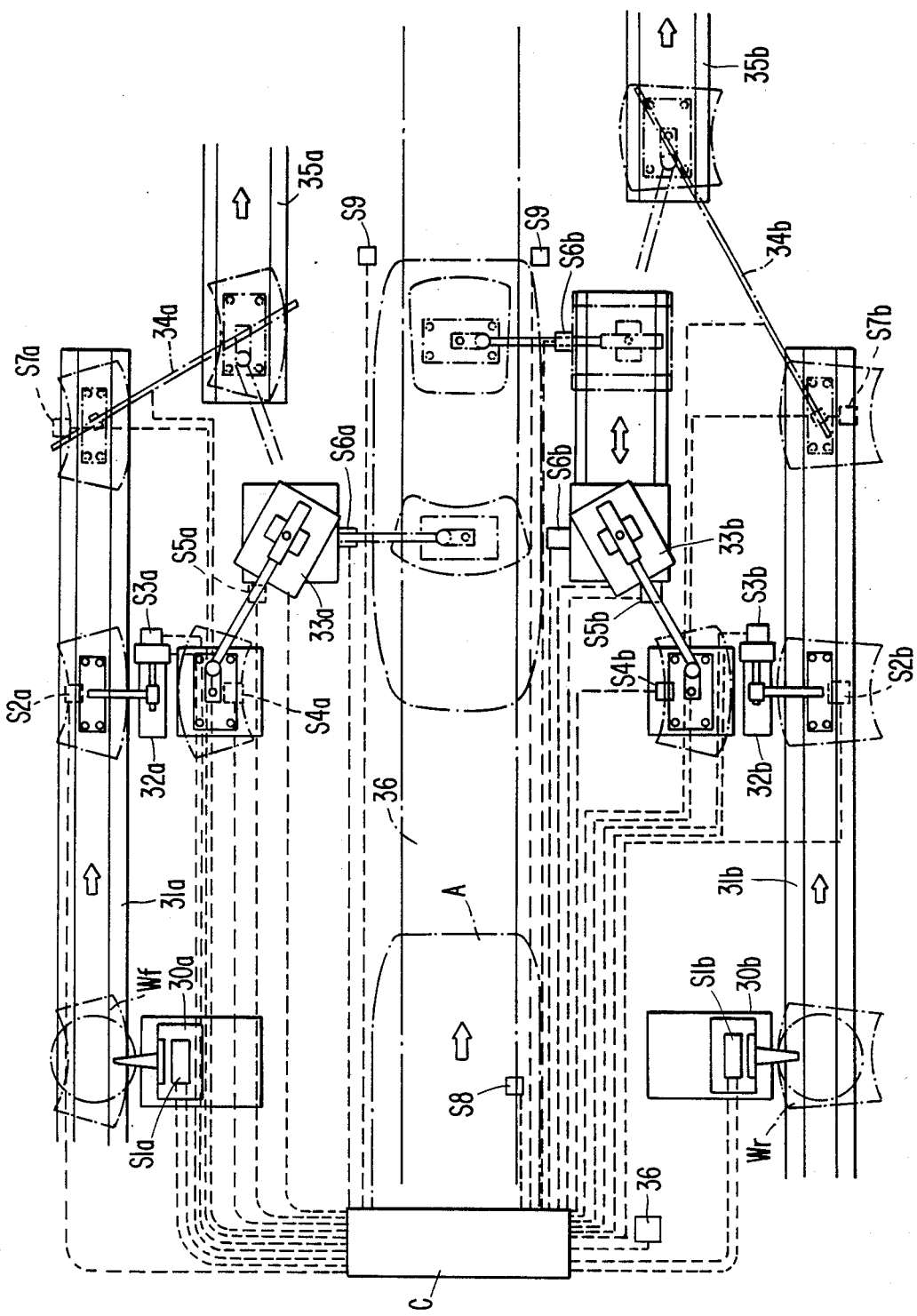
FIG. 2 shows a system for installing windshields in an automobile according to the present invention.

In the present invention, glass window panels such as windshields W are supplied along a feed path by means of a conveyor 31, as shown in FIG. 2. The windshields W pass sequentially through an adhesive applying station at which adhesive is applied to the edges of the windshield by an adhesive applying means 30. Subsequently, the windshields are delivered by the conveyor 31 to an inverting station at which the windshields are turned over by an inverting means 32. After each windshield is inverted, a transfer means 33 picks up the inverted windshield and places it in position on an automobile body A. In the event that the adhesive applied to the windshield has overcured, control means C including preventing means for preventing attachment of the windshield to the automobile body does so in one of several ways depending upon when the adhesive has cured to at least a predetermined amount. For instance, the inverting means 32 can be instructed by the control means C to leave the windshield on the conveyor 31 which continues to convey the windshield to a position downstream of the inverting means 32. In this case, an auxiliary transfer means 34 is provided for removing the windshield from the conveyor means 31 and a removing conveyor means 35 is provided for removing the windshield from the auxiliary transfer means 34 and conveying the windshield to a location for further processing thereof. In another instance, when the adhesive has cured to at least the predetermined amount after the inverting means 32 has started to invert the windshield or after the transfer means 33 has started to fit the windshield on the automobile A, it is necessary for the transfer means 33 to transfer the windshield to the removing conveyor means 35.

Each of the mechanisms described so far are conventional in the art. For instance, the adhesive applying means 30 can comprise the adhesive applying apparatus disclosed in U.S. Pat. No. 4,458,628, the subject matter of which is hereby incorporated by reference. Likewise, details of the conveyor means 31 of the present invention can comprise any of the systems disclosed in Japanese Laid-Open Patent Application Nos. 62-101587, 62-103270, 62-216877, 62-221382 and 62-221984, the subject matter of each of these published patent applications being hereby incorporated by reference. Along the same lines, the transfer means 33 of the present invention can comprise any one of the transfer robots described in Japanese Laid-Open Patent Publication Nos. 62-101587, 62-103270, 62-216877, 62-221982 and 62-221984, the subject matter of which has already been incorporated by reference. Furthermore, the transfer means 33 of the present invention can comprise the windshield setting apparatus disclosed in U.S. Pat. No. 4,453,303, the subject matter of which is hereby incorporated by reference. Also, the processing line of the present invention can include a positioning mechanism such as that described in Japanese Laid-Open Patent Publication No. 62-205869, the subject matter of which is hereby incorporated by reference and a wiping device such as that disclosed in published European Patent Application No. A10111206 can be incorporated in the apparatus of the present invention.

The processing line of the present invention includes sensor means for detecting positions of the windshields between the adhesive applying means 30 and the transfer means 33. The sensor means comprises a plurality of sensors, each of which outputs a signal to the computer comprising the control means C. The control means includes command means for controlling operation of the conveyor 31, the inverting means 32, the transfer means 33, the auxiliary transfer means 34 and the removing conveyor means 35. The preventing means further includes timer means for outputting a first signal to the command means indicating when adhesive applied to a particular windshield has cured to at least the predetermined amount. The timer means includes a timer which can be preset to a plurality of reference curing times, each of the reference curing times corresponding to a different adhesive curing condition based on temperature of air and/or humidity of air exposed to the curing adhesive.

The sensor means can include a first sensor means S1 for outputting a second signal to the timer means when the adhesive applying means 30 finishes applying adhesive to a windshield, the timer means measuring a first actual curing time T1 which passes after receiving the second signal and comparing the total actual curing time equal to the first actual curing time to a selected one of the reference curing times T0 whereby the timer means outputs the first signal to the command means when the total actual curing time is no less than the selected reference curing time T0.

The sensor means can include a second sensor means S2 for outputting a third signal to the timer means when the windshield has been delivered to the inverting means 32 by the conveyor means 31, the timer means measuring a second actual curing time T2 which passes after receiving the third signal and comparing the total actual curing time equal to the sum T1+T2 of the first and second actual curing times to the selected reference curing time T0 whereby the timer means outputs the first signal to the command means when the total actual curing time is no less than the selected reference curing time T0.

The sensor means can include a third sensor means S3 for outputting a fourth signal to the timer means when the inverting means 32 is actuated by the control means to invert the windshield, the timer means measuring a third actual curing time T3 which passes after receiving the fourth signal and comparing a total actual curing time equal to the sum T1+T2+T3 of the first, second and third actual curing times to the selected reference curing time T0 whereby the timer means outputs the first signal to the command means when the total actual curing time is no less than the selected reference curing time T0.

The sensor means can include a fourth sensor means S4 for outputting a fifth signal to the control means when the windshield has been inverted by the inverting means 32 and after the position of the windshield is adjusted for transfer by the transfer means, the control means actuates the transfer means 33 to begin operation.

The sensor means can include a fifth sensor means S5 for outputting a sixth signal to the timer means when the transfer means 33 is actuated by the control means to remove an inverted windshield from the inverting means 32, the timer means measuring a fourth actual curing time T4 which passes after receiving the sixth signal and comparing a total actual curing time equal to the sum T1+T2+T3+T4 of the first, second, third and fourth actual curing times to the selected reference curing time T0 whereby the timer means outputs the first signal to the command means when the total actual curing time is no less than the selected reference curing time T0.

The sensor means can also include a sixth sensor means S6 for outputting a seventh signal to the control means which resets the timer means when the transfer means finishes transfer of the inverted windshield to the position at which the windshield is set onto the automobile body.

Thus, the command means prevents attachment of the windshield to the automobile body after receiving at least one of the second and third signals by preventing the inverting means 32 from removing the windshield from the conveyor means 31 when the total actual curing time T1 or T1+T2 is no less than the selected reference curing time T0 and the command means actuates the conveyor means 31 to convey the windshield to a location downstream of the inverting means and actuates the auxiliary transfer means 34 to remove the windshield from the conveyor means 31 after which the removing conveyor 35 is actuated by the command means to remove the windshield from the auxiliary transfer means 34 and convey the windshield to a location for further processing thereof. On the other hand, the command means prevents attachment of the windshield to the automobile body after receiving at least one of the fourth, fifth and sixth signals when the total actual curing time T1+T2+T3 or T1+T2+T3+T4 is no less than the selected reference curing time T0 by actuating the transfer means 33 to transfer the windshield to the removing conveyor 35 and by actuating the removing conveyor 35 to transfer the windshield to the location for further processing thereof. When the windshield is conveyed to a position at which it can be transferred by the auxiliary transfer means 34, an auxiliary transfer sensor S7 outputs an auxiliary transfer actuating signal to the command means and the command means actuates the auxiliary transfer means 34 to remove the windshield after receiving the auxiliary transfer actuating signal.

In one embodiment of the present invention, windshields can be set in position on the automobile body A by means of a single processing line comprising a conveyor 31b, an adhesive applying means 30b, an inverting means 32b, a transfer means 33b, an auxiliary transfer means 34b and a removing conveyor means 35b. In this embodiment, the transfer means 33b is movable in a direction parallel to the feed path of the automobile bodies as indicated by the two-way arrow in FIG. 2. This type of glass setting robot 33b is conventional and shown in Japanese Laid-Open Patent Application Nos. 62-101587, 62-103270 and 62-216877, the subject matter of which has already been incorporated by reference. In another embodiment, two processing lines are provided, the second processing line including a conveyor 31a, an adhesive applying means 30a, an inverting means 32a, a transfer means 33a, an auxiliary transfer means 34a and a removing conveyor means 35a. In each of the two embodiments, the positions of the windshields are detected by a plurality of sensors such as the seven sensors which have already been described. Thus, when two processing lines are provided, it is not necessary for the transfer means 33b to be movable for the purpose of installing one of the windshields. That is, the processing line which includes the transfer means 33b can be modified such that the transfer means 33b is fixed in position at a location for installing rear windshields in the same manner that the transfer means 33a is fixed in position for installing front windshields, as shown in FIG. 2. On the other hand, one or both of the transfer means 33 can be movable in the manner indicated for the transfer means 33b whereby both types of windshields, front windshields Wf and rear windshields Wr, can be installed by either processing line.

Positioned along the automobile body conveyor line 36 is a sensor S8 which sends a signal to the computer C to indicate one pitch of movement of the conveyor 36 and sensors S9 send a signal to the computer C indicating when an automobile body is in a windshield glass setting position. Accordingly, the computer C coordinates movement of the automobile body conveyor 36 and the mechanisms for installing windshields in the automobile bodies.

To install windshields, it is necessary to determine when the adhesive applied to the windshield by the adhesive applying means 30 has cured to at least a predetermined amount and to control operation of the transfer means 33 such that the windshield is set in position on the automobile body when the adhesive on the windshield has not cured to at least the predetermined amount and such that the windshield is not set in position on the automobile body when the adhesive on the windshield has cured to at least the predetermined amount. As explained earlier, the determining step is performed by comparing an actual curing time of adhesive applied to the windshield to one of the plurality of reference curing times, each of the reference curing times corresponding to a different adhesive curing condition such as the temperature of air exposed to the curing adhesive, the humidity of air exposed to the curing adhesive or a combination of both. For instance, one of the reference curing times is 360 seconds and corresponds to an adhesive curing condition wherein the temperature is at least 60 degrees F and the humidity is at least 60 percent. Another reference curing time is 360 seconds, which corresponds to an adhesive curing condition wherein the temperature is less than 60 degrees F. and the humidity is at least 80 percent. Another reference curing time is 1,080 seconds and corresponds to an adhesive curing condition wherein the temperature is below 60 degrees F. and the humidity is below 60 percent or the temperature is at least 60 degrees F. and the humidity is below 80 percent. Thus, where the adhesive is a urethane adhesive such as type 551H manufactured by Sanstar Engineering Co., Ltd., the actual curing time is about 420 to 480 seconds when the temperature of air exposed to the curing adhesive is at least 60 degrees F. and the humidity is at least 60 percent or the temperature is less than 60 degrees F. and the humidity is at least 80 percent whereas the curing time is 1,200 to 1,320 seconds when the conditions for the 420 to 480 second curing time are not met.

Figure 3A:
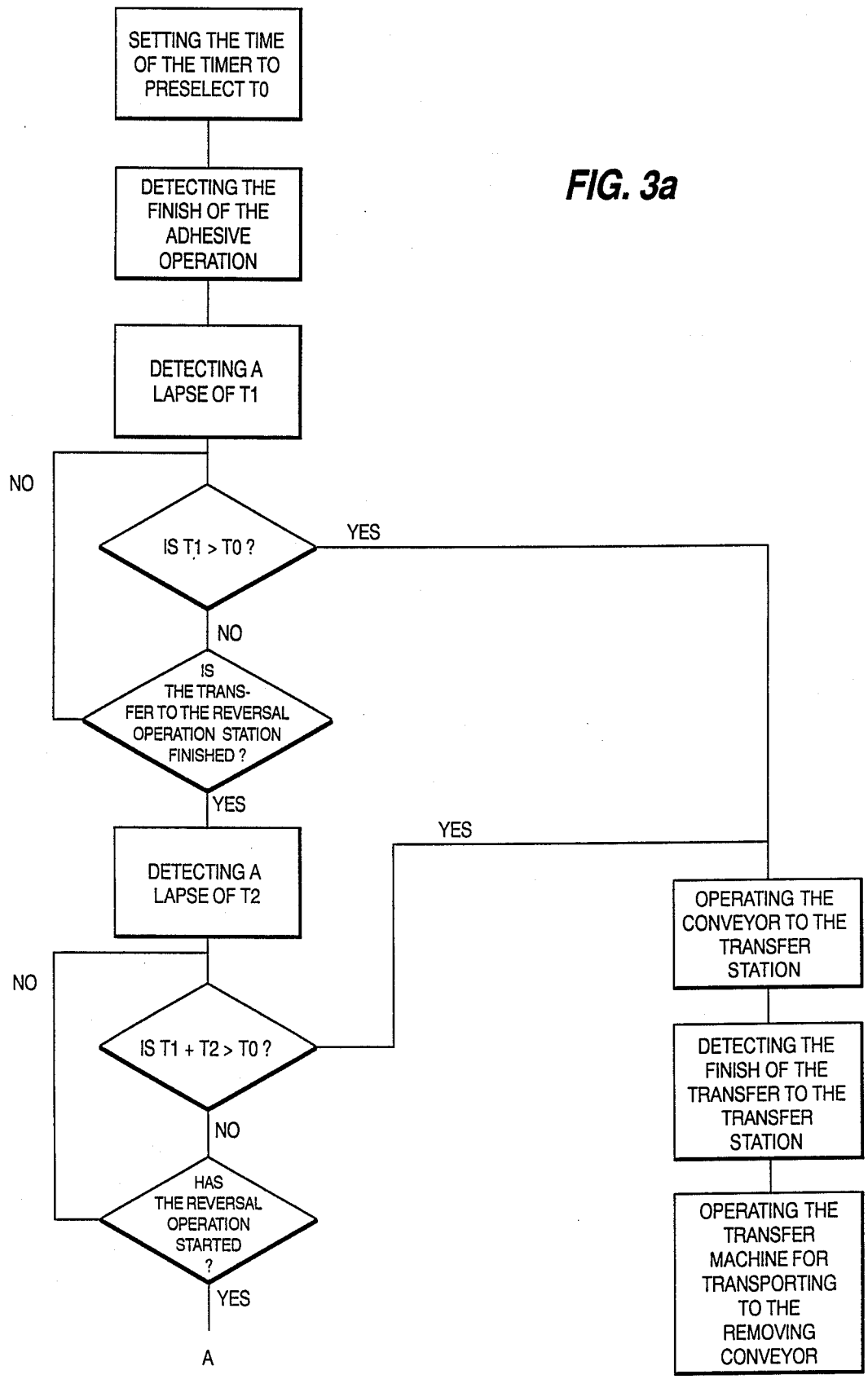
FIG. 3 shows a flow chart for the operations of the control means of the present invention.
Figure 3B:
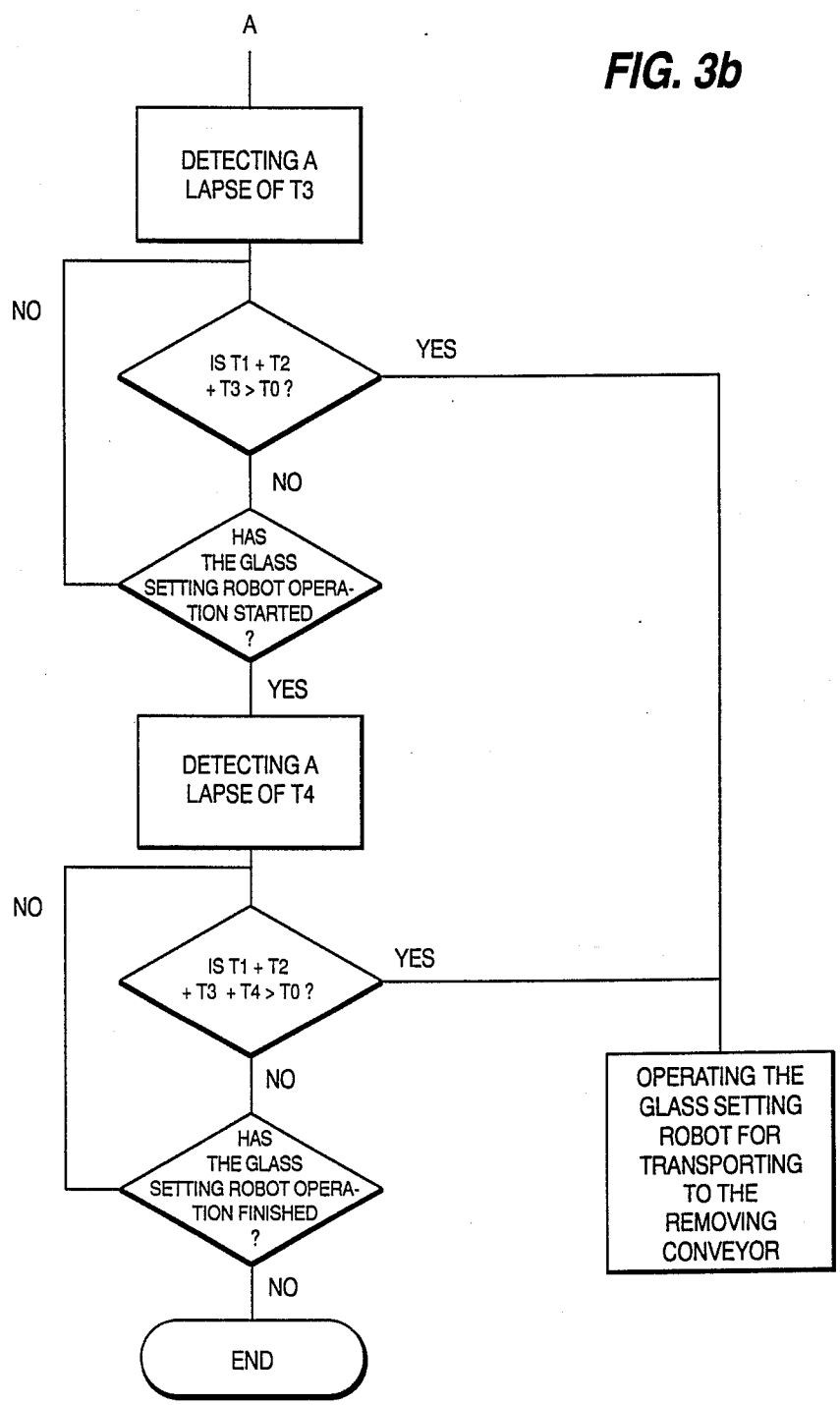

A flow chart for the operations of the computer C is shown in FIGS. 3a and 3b. Initially, the time of the timer T0 corresponding to the selected reference curing time is set either manually or automatically. Then, the finish of the adhesive applying operation is detected by sensor means S1 and the timer is started to detect a lapse of T1. If T1 exceeds T0, the conveyor 31 is operated to move the windshield until its position is detected by sensor S7 after which the auxiliary transfer means 34 is operated to transfer the windshield to the removing conveyor 35. If T1 does not exceed T0, the conveyor 31 is operated until the windshield is detected by sensor S2. At this point, the timer is started to detect a lapse of T2 and the total of T2 and T1 is compared to T0 and if this total exceeds T0, the conveyor 31 is operated to transfer the windshield until sensor S7 detects its arrival and the auxiliary transfer means 34 and removing conveyor 35 are operated to transfer the windshield to a position for further processing thereof. If the total of T1 and T2 does not exceed T0, the start of the inverting operation is detected by sensor S3 and the timer detects a lapse of T3. If the total of T1, T2 and T3 exceeds T0 the transfer means 33 is operated to remove the windshield from the inverting means 32 and transfer the windshield to the removing conveyor 35. Then, the start of the windshield setting operation is detected by sensor S5 and the timer is started to detect a lapse of T4. If the total of T1, T2, T3 and T4 exceeds T0, the transfer means 33 transfers the windshield to the removing conveyor 35. The end of the windshield setting operation is detected by sensor S6 which terminates one cycle of the glass setting operation. The entire operation can be completely automated by providing sensors to measure the temperature and humidity whereby the reference curing time can be automatically determined and the timer can be automatically preset to time T0. Alternatively, a switch 36 connected to the computer C can be provided whereby the reference curing time can be manually selected to preset the timer at one of a plurality of reference curing times. For instance, the switch 36 can be a two-way switch which in one position sets the reference curing time to 360 seconds and in the other position sets the reference curing time to 1080 seconds.

Although the invention has been described with reference to particular embodiments thereof, it should be noted that the invention is in no way limited to the details of the illustrated structures but changes and modifications may be made without departing from the scope of the appended claims.

What is claimed is:

1. An apparatus for supplying and installing at least one glass window panel in an automobile body, comprising:
   at least one conveyor means for supporting and conveying at least one glass window panel along a feed path;
   at least one means along the feed path for applying adhesive to the glass window panel;
   at least one transfer means downstream of the adhesive applying means for removing the glass window panel from the conveyor means and transferring the glass window panel to a position at which the glass window panel can be attached to an automobile body by being bonded thereto with the adhesive applied to the glass window panel by the adhesive applying means; and control means including preventing means for preventing attachment of the glass window panel to the automobile body when the adhesive applied to the glass window panel has cured to at least a predetermined amount the control means including command means for controlling operation of the transfer means so that a glass window panel having adhesive thereon which has cured to at least the predetermined amount can be prevented from being applied to the automobile body by preventing the transfer means from removing the glass window panel from the conveyor means, the preventing mean including timer means for outputting a first signal to the command means indicating when adhesive applied to the glass window panel has cured to at least the predetermined amount, the timer means including a timer which can be preset to a plurality of reference curing times, each of the reference curing times corresponding to a different adhesive curing condition selected from the group consisting of temperature of air exposed to the curing adhesive and humidity of air exposed to the curing adhesive.

2. The apparatus of claim 1, wherein the at least one conveyor means comprises a front windshield conveyor means for supporting and conveying a glass window panel comprising a front windshield and a rear windshield conveyor means for supporting and conveying a glass window panel comprising a rear windshield, the at least one adhesive applying means comprises a front windshield adhesive applying means for applying adhesive to an outer periphery of a front windshield and a rear windshield adhesive applying means for applying adhesive to an outer periphery of a rear windshield, and the at least one transfer means comprises a front windshield transfer means for removing a front windshield from the front windshield conveyor means and a rear windshield transfer means for removing a rear windshield from the rear windshield conveyor means.

3. The apparatus of claim 1, further comprising at least one inverting mans along the feed path and downstream of the adhesive applying means for inverting the glass window panel after the glass window panel has been delivered to the adhesive applying means by the conveyor means, adhesive has been applied to the glass window panel by the adhesive applying means and the glass window panel has been conveyed to the inverting means by the conveyor means.

4. The apparatus of claim 1, further comprising front windshield inverting means along the feed path defined by the front windshield conveyor means and downstream of the front windshield adhesive applying means for inverting the front windshield after the front windshield has been delivered to the front windshield adhesive applying means by the front windshield conveyor means, adhesive has been applied to the front windshield by the front windshield adhesive means and the front windshield has been conveyed to the front windshield inverting means by the front windshield conveyor means and rear windshield inverting means along the feed path defined by the rear windshield conveyor means and downstream of the rear windshield adhesive applying means for inverting the rear windshield after the rear windshield has been delivered to the rear windshield adhesive applying means by the rear windshield conveyor means, adhesive has been applied to the rear windshield by the rear windshield adhesive applying means and the rear windshield has been conveyed to the rear windshield inverting means by the rear windshield conveyor means.

5. The apparatus of claim 1, further including sensor means for detecting positions of the glass window panel between the adhesive applying means and the transfer means.

6. The apparatus of claim 1, further comprising switch means operatively connected to the control means for manually selecting any one of the reference curing times.

7. The apparatus of claim 6, further including first sensor means for outputting a second signal to the timer means when the adhesive applying means finishes applying adhesive to the glass window panel, the timer means measuring a first actual curing time which passes after receiving the second signal and comparing the total actual curing time equal to the first actual curing time to a selected one of the reference curing times, the timer means outputting the first signal to the command means when the total actual curing time is no less than the selected reference curing time.

8. The apparatus of claim 7, further comprising:
inverting means along the feed path and downstream of the adhesive applying means for inverting the glass window panel after the glass window panel has been delivered to the adhesive applying means by the conveyor means, adhesive has been applied to the glass window panel by the adhesive applying means and the glass window panel has been conveyed to the inverting means by the conveyor means; and second sensor means for outputting a third signal to the timer means when the glass window panel has been delivered to the inverting means by the conveyor means, the timer means measuring a second actual curing time which passes after receiving the third signal and comparing a total actual curing time equal to the sum of the first and second actual curing times to a selected one of the reference curing times, the timer means outputting the first signal to the command means when the total actual curing time is no less than the selected reference curing time.

9. The apparatus of claim 8, further including:
third sensor means for outputting a fourth signal to the timer means when the inverting means begins to invert the glass window panel, the timer means, measuring a third actual curing time which passes after receiving the fourth signal and comparing a total actual curing time equal to the sum of the first, second and third actual curing times to a selected one of the reference curing times, the timer means outputting the first signal to the command means when the total actual curing time is no less than the selected reference curing time; and fourth sensor means for outputting a fifth signal to the control means after the glass window panel has been inverted by the inverting means and the windshield is ready to be transferred by the transfer means, the control means actuating the transfer means to begin transfer of the windshield.

10. The apparatus of claim 9, further including fifth sensor means for outputting a sixth signal to the timer means when the transfer means begins to remove an inverted glass window panel from the inverting means, the timer means measuring a fourth actual curing time which passes after receiving the sixth signal and comparing a total actual curing time equal to the sum of the first, second, third and fourth actual curing times to a selected one of the reference curing times, the timer means outputting the first signal to the command means when the total actual curing time is no less than the selected reference curing time; and sixth sensor means for outputting a seventh signal to the timer means when the transfer means finishes transfer of the inverted glass window panel to the position at which the glass window panel is set onto the automobile body.

11. The apparatus of claim 9, further including at least one auxiliary transfer means for removing the glass window panel from the conveyor means when adhesive on the glass window panel has cured beyond the predetermined amount, the command means preventing attachment of the glass window panel to the automobile body after the timer means receives at least one of the second and third signals by preventing the inverting means from removing the glass window panel from the conveyor means when the total actual curing time is no less than the selected reference curing time, by actuating the conveyor means to convey the glass window panel to a location downstream of the inverting means, and by actuating the auxiliary transfer means to remove the glass window panel from the conveyor means, the apparatus including auxiliary transfer sensor means for outputting an auxiliary transfer actuating signal to the command means when the auxiliary transfer means detects a glass window panel at a removal position on the conveyor means, the command means actuating the auxiliary transfer means to remove the glass window panel after receiving the auxiliary transfer actuating signal.

12. The apparatus of claim 10, further including at least one removing conveyor means for removing a glass window panel from the transfer means and conveying the glass window panel to a location for further processing thereof when adhesive o the glass window panel has cured to at least the predetermined amount, the command means preventing attachment of the glass window panel to the automobile body after the timer means receives at least one of the fourth, fifth and sixth signals by actuating the transfer means to transfer the glass window panel to the removing conveyor means when the actual curing time is no less than the selected reference curing time, and by actuating the removing conveyor means to transfer the glass window panel to the location for further processing thereof.

13. The apparatus of claim 1, further comprising automobile body conveyor means for conveying automobile bodies sequentially to a glass setting station at which the transfer means can set a glass window panel having adhesive applied thereto by the adhesive applying means on a respective one of the automobile bodies.

14. A method of installing at least one windshield in an automobile body and preventing installation of a windshield having adhesive thereon which has cured to at least a predetermined amount wherein at least one conveyor means is provided for conveying at least one windshield along a feed path, at least one adhesive applying means is provided along the feed path for applying adhesive to the windshield, at least one transfer means is provided downstream of the adhesive applying means for removing the windshield from the conveyor means and transferring the windshield to a glass setting position at which the windshield is attached to an automobile body with adhesive applied to the windshield by the adhesive applying means and automobile body transfer means is provided for transferring the automobile body to the glass setting position, the method comprising:

applying adhesive to a windshield by the adhesive applying means;
determining when the adhesive applied to the windshield by the adhesive applying means has cured to at least a predetermined amount; and
controlling operation of the transfer means such that the windshield is set in position on the automobile body when the adhesive on the windshield has not cured to at least the predetermined amount and such that the windshield is not set in position on the automobile body when the adhesive on the windshield has cured to at least the predetermined amount, the determining step being performed by comparing an actual curing time of adhesive applied to the windshield by the adhesive applying means to one of a plurality of reference curing times, each of the reference curing times corresponding to a different adhesive curing condition selected from the group consisting of temperature of air exposed to the curing adhesive and humidity of air exposed to the curing adhesive.

15. The method of claim 14, wherein a switch is provided for selecting any one of the plurality of reference curing times, the controlling step being performed by setting the switch in a position corresponding to a selected on of the reference curing times.

16. The method of claim 15, wherein one of the reference curing times is 360 seconds and corresponds to an adhesive curing condition wherein the temperature is at least 60 F. and the humidity is at least 60%, another one of the reference curing times is 360 seconds and corresponds to an adhesive curing condition wherein the temperature is less than 60 F. and the humidity is at least 80%, and another one of the reference curing times is 1080 seconds and corresponds to an adhesive curing condition wherein the temperature is below 60 F and the humidity is below 80%.

17. The method of claim 16, wherein the step of applying adhesive is performed using a urethane adhesive having an actual curing time of about 420 to 480 seconds.

18. The method of claim 15, wherein said determining step includes a step of detecting when the adhesive applying means finishes applying adhesive to the windshield.

19. The method of claim 15, wherein an inverting means is provided downstream of the adhesive applying means for removing a windshield from the conveyor means, inverting the windshield and positioning the windshield for removal therefrom by the transfer means, the determining step including a step of detecting when the inverting means begins inverting the windshield, the determining step further including a step of detecting when the inverting means finishes inverting of the windshield, the determining step further including a step of detecting when the transfer means begins to remove the windshield from the inverting means, the determining step further including a step of detecting when the transfer means transfers the windshield to a position for setting of the windshield on the automobile body.

20. The method of claim 14, wherein:

the controlling step includes a step of operating the conveyor means to move the windshield downstream of the transfer means when the actual curing time is no less than the selected reference curing time;

auxiliary transfer means is provided downstream of the transfer means for removing a windshield with overcured adhesive thereon from the conveyor means, the controlling step including a step of operating the auxiliary transfer means to remove the windshield from the conveyor means when the actual curing time is no less than the selected reference curing time;

removing conveyor means is provided for receiving the windshield removed from the conveyor means by the auxiliary transfer means, the controlling step including a step of operating the removing conveyor means to convey the windshield removed from the conveyor means by the auxiliary means when the actual curing time is no less than the selected reference curing time; the removing conveyor means being provided for receiving a windshield from the transfer means and the controlling step including a step of operating the transfer means to remove the windshield from the inverting means and transfer the windshield to the removing conveyor means when the actual curing time is no less than the selected reference time; the removing conveyor means being provided for receiving a windshield from the transfer means and the controlling step including a step of operating the transfer means to remove the windshield from the inverting means and transfer the windshield to the removing conveyor means when the actual curing time is no less than the selected reference time.

* * * * *